United States Patent [19]

Petrillo

[11] Patent Number: 5,032,324
[45] Date of Patent: Jul. 16, 1991

[54] HIGH YIELD AIR DIFFUSER FOR TANKS USED IN THE AEROBIC TREATMENT OF WASTE WATERS

[76] Inventor: Giacinto Petrillo, Viale Scarampo, 45, I-20148 Milano, Italy

[21] Appl. No.: 350,528
[22] PCT Filed: Nov. 4, 1987
[86] PCT No.: PCT/EP87/00642
§ 371 Date: May 8, 1989
§ 102(e) Date: May 8, 1989
[87] PCT Pub. No.: WO88/03514
PCT Pub. Date: May 19, 1988

[30] Foreign Application Priority Data
Nov. 6, 1986 [IT] Italy ..................................... 23601[U]

[51] Int. Cl.⁵ ............................................. B01F 3/04
[52] U.S. Cl. ....................................... 261/77; 261/123
[58] Field of Search ................................. 261/77, 123

[56] References Cited

U.S. PATENT DOCUMENTS

| | | | |
|---|---|---|---|
| 2,353,195 | 7/1944 | Sims | 261/77 |
| 2,967,399 | 1/1961 | Laurie | 261/77 |
| 3,148,509 | 9/1964 | Laurie | 261/123 |
| 3,452,966 | 7/1969 | Smolski . | |
| 3,628,775 | 12/1971 | McConnell | 261/77 |
| 3,852,384 | 12/1974 | Bearden | 261/77 |
| 4,051,035 | 9/1977 | Boschen et al. | 261/77 |
| 4,138,335 | 2/1979 | Murphy | 261/123 |
| 4,504,388 | 3/1985 | Desbos et al. | 261/77 |
| 4,569,757 | 2/1986 | Moore | 261/77 |

FOREIGN PATENT DOCUMENTS

| | | | |
|---|---|---|---|
| 2736271 | 2/1979 | Fed. Rep. of Germany | 261/77 |
| 3241724 | 5/1984 | Fed. Rep. of Germany | 210/220 |
| 2528324 | 12/1983 | France . | |
| 52-19462 | 2/1977 | Japan | 261/123 |
| 1519644 | 8/1978 | United Kingdom | 261/123 |

OTHER PUBLICATIONS

The American College Dictionary, Apr. 1982, p. 1171.

*Primary Examiner*—Tim Miles
*Attorney, Agent, or Firm*—Fleit, Jacobson, Cohn, Price, Holman & Stern

[57] ABSTRACT

Diffuser (10) comprising a cylindrical body (11) inside which a helical section (12, 12a) is provided. At the base and at the top, a sparger (13) and a distributor (14) respectively are foreseen. Preferably a second sparger is foreseen at the top, around the distributor (14). Each sparger (13, 13a) consists of a hopper (15) having the major base provided with tongues (16) that radially depart from its periphery. Distributor (14) comprises a truncated-cone portion (24) having the minor base made up of a conical element (25), openings (26, 27) being provided both in the conical element and in the lateral surface of the hopper (15). The diffuser (10) is fixed to a suitable support (22) by means of tie rods (21) held on the protruding edge (18) of the upper sparger (13a).

12 Claims, 4 Drawing Sheets

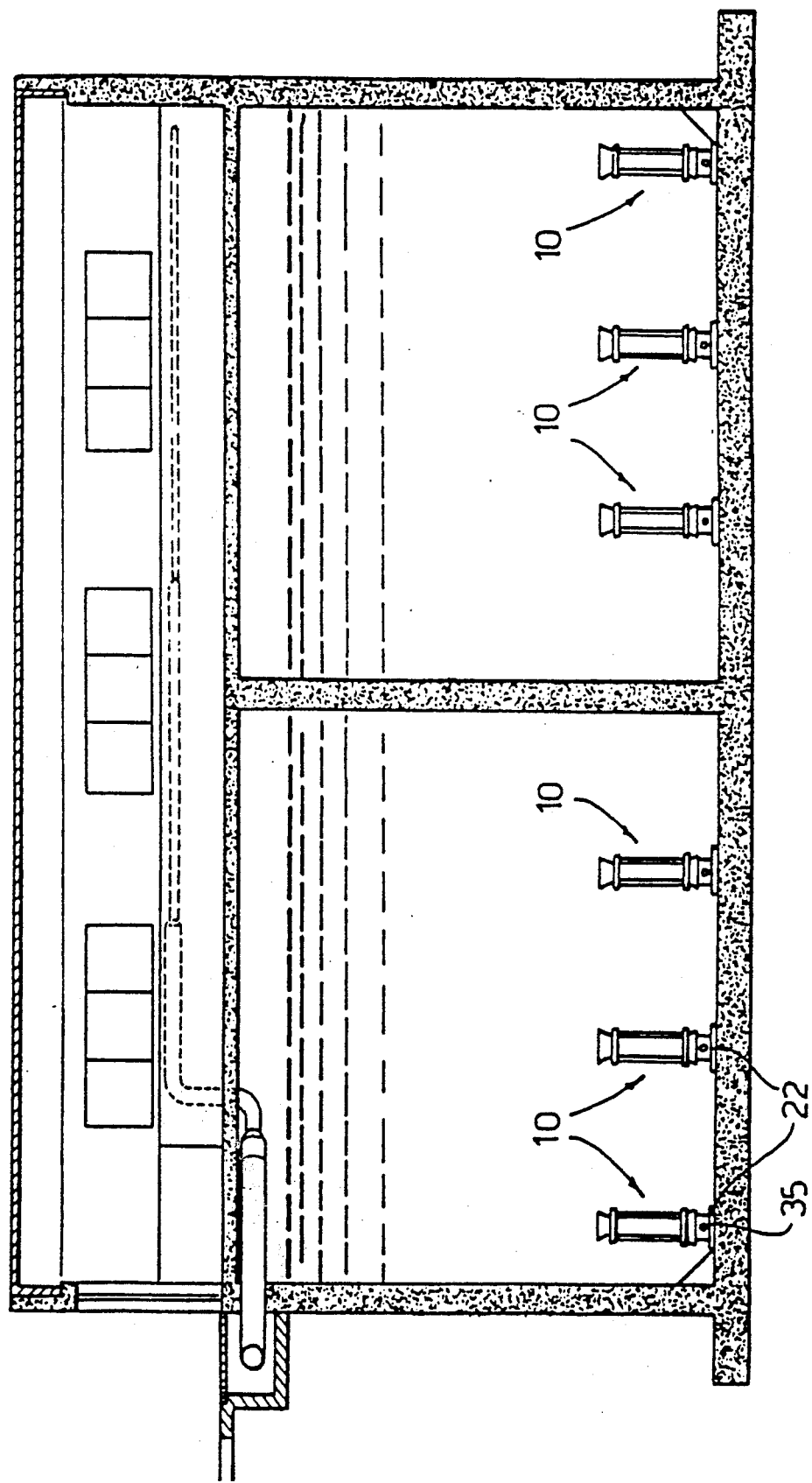

HIGH YIELD AIR DIFFUSER FOR TANKS USED IN THE AEROBIC TREATMENT OF WASTE WATERS

The present invention refers to the diffusers used in tanks for the aerobic purification of waste waters.

The known diffusers are made in such a way so as to disperse the air blown into pipes running across the bottom of tanks for aerobic treatment filled with waste waters.

Said diffusers are located at each air exit from the above mentioned pipes. These diffusers have however a reduced efficiency because the air is distributed in bubbles having a dimension that is unsuitable for obtaining a uniform dispersion and efficient transfer of the oxygen to the liquid; in fact, the bubbles having big dimensions reach the surface before an effective oxygen transfer to the waters to be treated takes place.

In order to improve the efficiency of the diffusers, U.S. Pat. No. 3,852,384 foresees that the blown-in air bubbles be forced to follow a not rectilinear path, in particular a spiral path, that increases the bubbles stay time in the waters to be treated. The spiral path is obtained by collecting the blown-in air in vertical cylindrical elements where one or more helical baffles are provided so as to act as guides for the bubbles. In this way the air and water mixture follows a spiral path that prolongs the interface contact between bubbles and liquid. The aforesaid cylindrical elements are placed above the pipes running horizontally, near the bottom of the tank, these pipes being horizontal and perforated in the lower part for the passage of the blown-in air. Nevertheless, the yield has not reached optimum levels.

The object of the present invention is that of improving the yield of the diffusers so as to obtain finely dispersed bubbles creating an efficacious transfer of the oxygen to the waters to be treated.

This aim is achieved by providing at the base and top of the cylindrical body, comprising at its interior one or more helical sections, a sparger and a distributor respectively. The sparger, or dispersing means consists of a hopper having the major base provided with tongues that radially depart from its periphery in order to catch the bubbles coming out from a horizontal pipe running near the bottom of the tank and to cut the mass of bubbles creating an additional turbulence. The minor base of the sparger is provided with an edge protruding towards the outside and openings for the passage of tie rods for the anchorage of the diffuser.

The minor base is circumferentially provided with a seat for receiving the end of the cylindrical body which is preferably formed by a plurality of sections welded together.

The distributor placed at the top of the cylindrical element comprises a truncated cone shaped portion with the major base open and the minor base provided with openings radially distributed. Moreover, the lateral surface is provided with further slots for the outlet of bubbles.

Preferably, the minor base consists of a tapered element with the apex of the cone turned towards the inside of the diffuser.

The distributor is fixed to the cylindrical body by means of another hopper quite similar to the one of the sparger, with the major base facing upwards so that this hopper is capable of helping the discharge of the air-water mixture.

The described diffusers are uniformly distributed at the bottom of the tank and anchored to supports, in the shape of concrete blocks, preferably by means of tie rods fixed with bolts screwed on threaded rods protruding from the concrete blocks, a perforated plate that is inserted on the aforesaid rods being foreseen at the lower end of the tie rod. At the top, the tie rods are fixed on the protruding edge of the second sparger that surrounds the distributor, preferably with nuts screwn on their threaded ends by interposing suitable washers.

The present invention according to a preferred but not limitative embodiment, is shown in the enclosed drawings, in which:

FIG. 8 shows a section of the tank with the diffusers installed.

Figure 1:
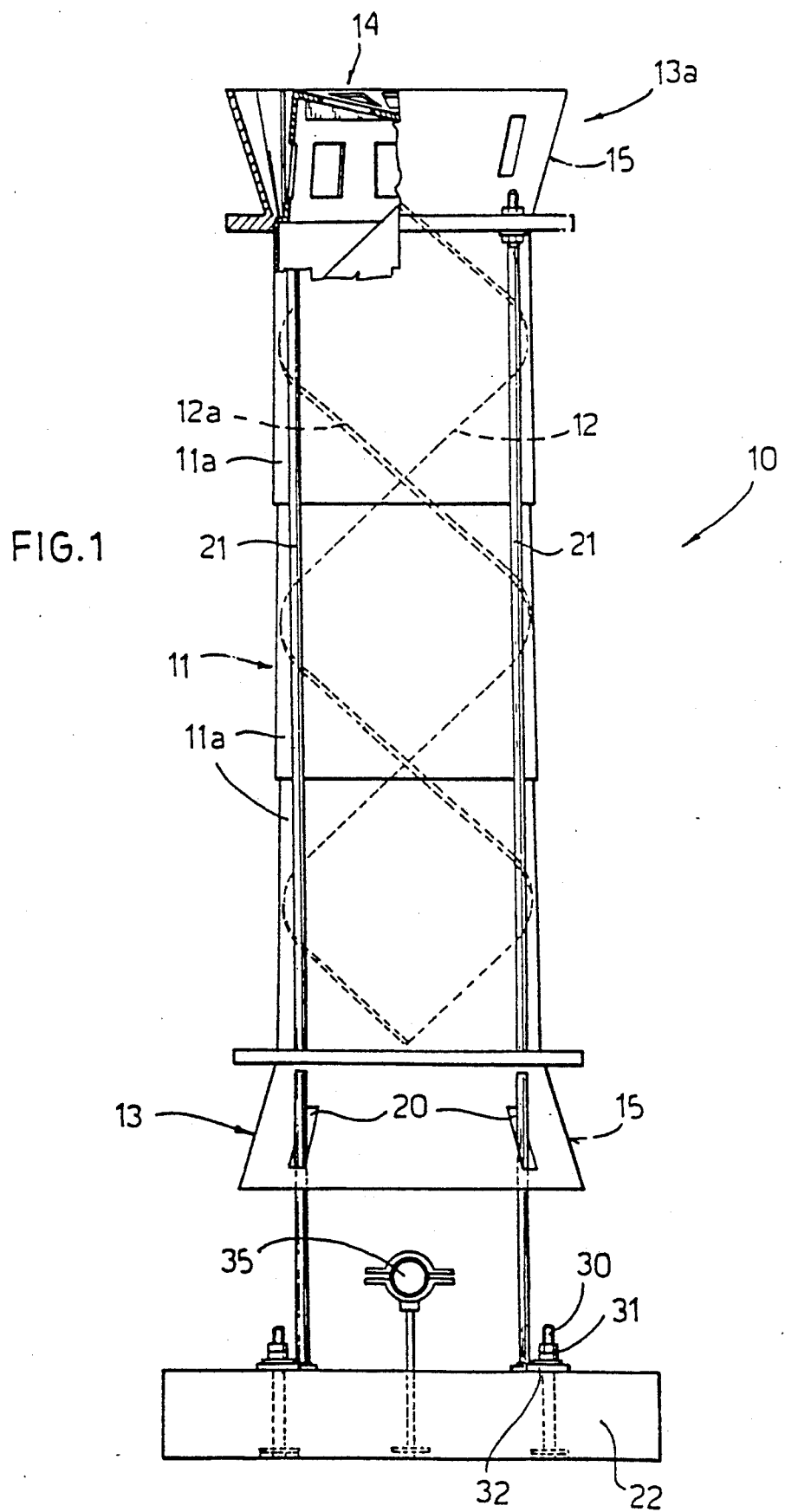
FIG. 1 shows a partially sectioned side view of the diffuser anchored at its support.

A diffuser 10 is shown in FIG. 1 comprising a cylindrical body 11 containing two helical sections 12 and 12a that cross each other, forming two spiral canals for discharging the air-water mixture to be treated. The cylindrical body 11 is preferably made of a plurality of sections 11a. The diffuser is provided at its base with a sparger, or dispersing means 13 and at the top with a distributor 14 which is held on the end of the diffuser by means of a second sparger 13a, the hopper 15 of which laterally surrounds said distributor 14.

Figure 2:
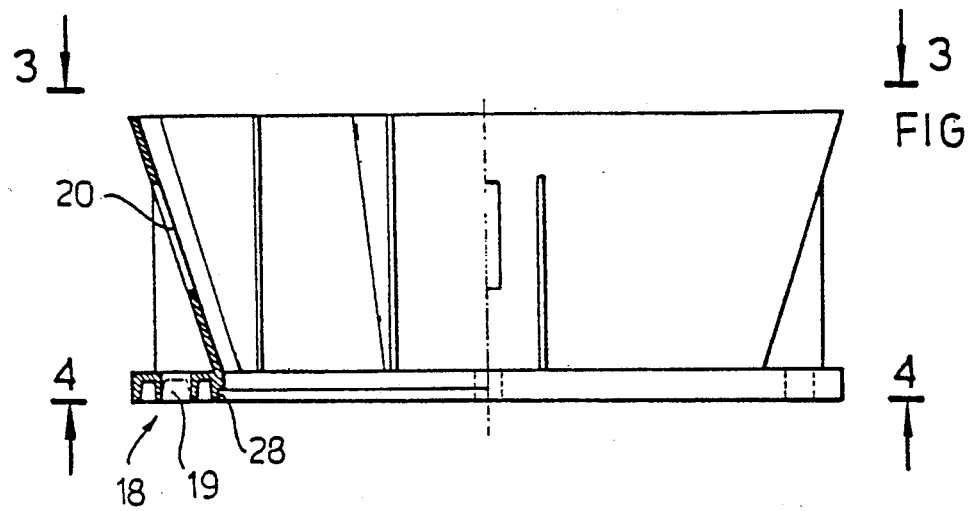
FIG. 2 shows a side view of the sparger.
Figure 3:
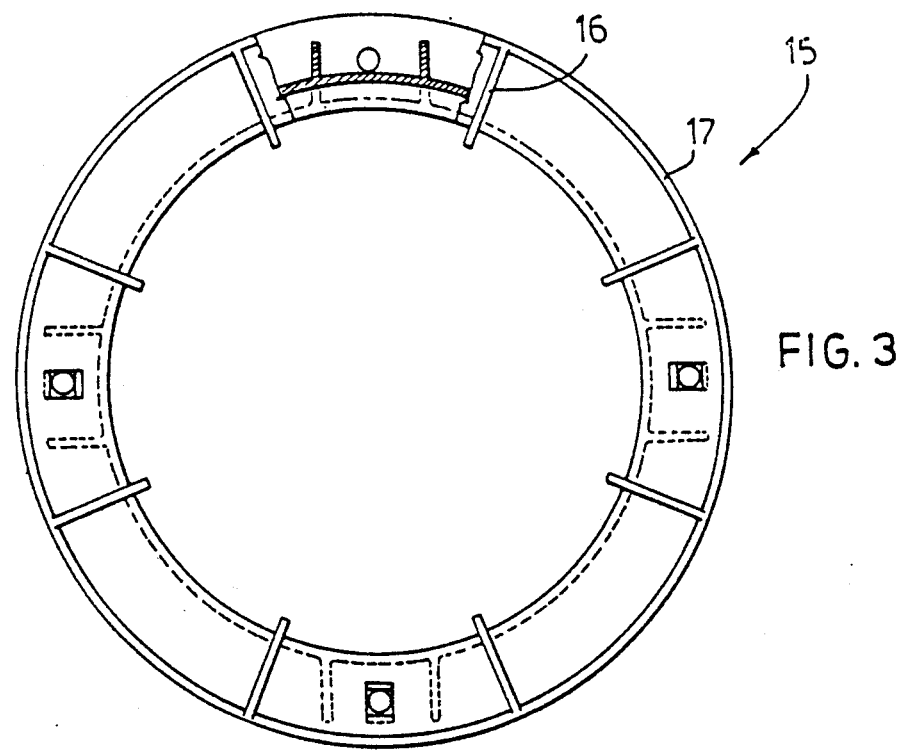
FIG. 3 shows a view of the sparger taken along line 3—3 of FIG. 2.
Figure 4:
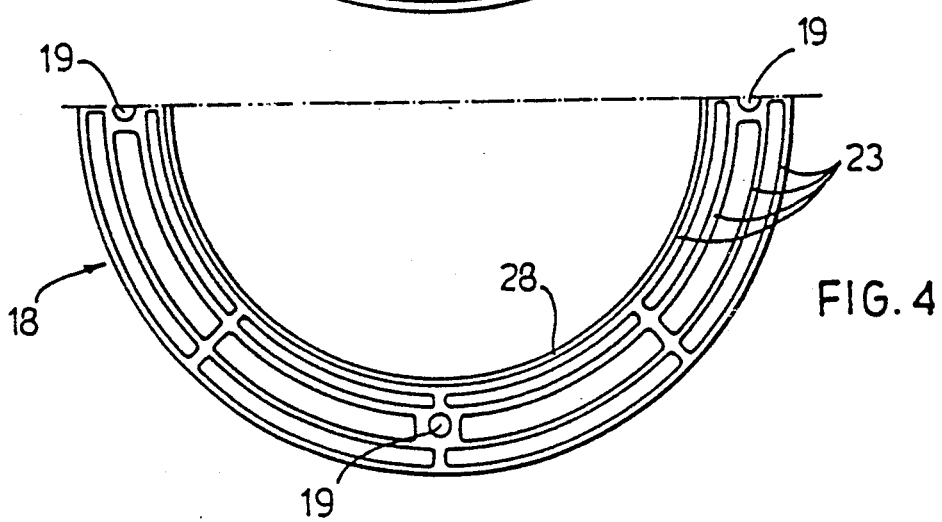
FIG. 4 shows a view of the sparger taken along line 4—4 of FIG. 2.

The sparger 13 (that is quite similar to sparger 13a) is shown in detail in FIGS. 2, 3 and 4. It is made of a hopper 15, the minor base of which has a periphery 17 provided with tongues 16 perpendicular to said periphery 17. The minor base is also provided with a protruding edge 18 having openings 19 for the passage of tie rods 21 (FIG. 1) fixing the diffuser 10. The side surface of the hopper (15) has further openings 20 so as to allow the fixing tie rods 21 to extend perpendicular to support 22 on which they are fixed. This protruding edge 18 also has reinforcements 23 circumferentially disposed.

The minor base of hopper 15 is provided circumferentially with a seat 28 capable of receiving an end of the cylindrical body 11.

Figure 5:
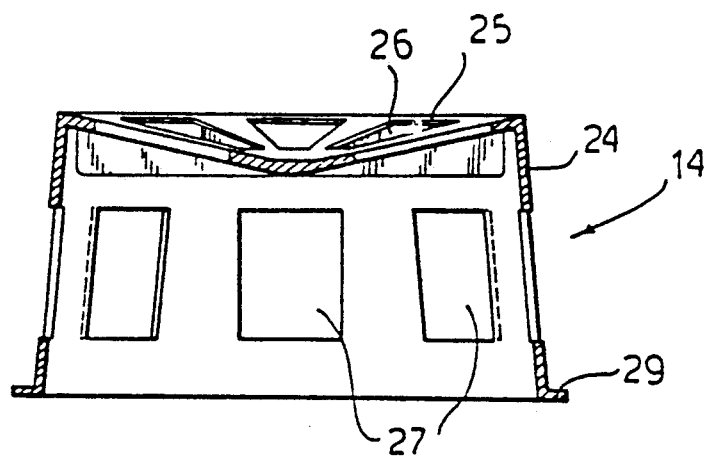
FIG. 5 shows a partially sectioned side view of the distributor.
Figure 6:
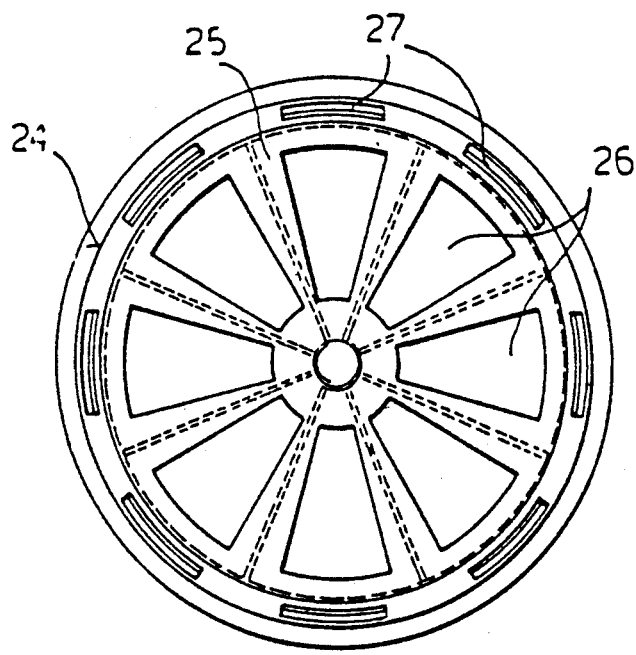
FIG. 6 shows an upper view of the distributor.

Distributor 14 is shown in FIGS. 5 and 6. It comprises a truncated cone shaped portion 24, the minor base of which consists in a tapered element 25 having the apex of the cone turned towards the inside of portion 24. It can be noticed that the tapered element is provided with openings 26, having almost trapezoidal shape. Furthermore, the truncated cone shaped portion 24 is also laterally provided with rectangular openings 27. These openings 26 and 27 are used for the distribution of the mixture of air-water to be treated.

Said truncated cone portion 24 is held at the end of the cylindrical body 11 by means of a second sparger 13a over-turned with respect to the position of sparger 13 (see FIG. 1). An engaging means 29 is foreseen inserted in seat 28 of the minor base of the hopper 15, placed along the major base of the truncated cone portion 24.

Figure 7:
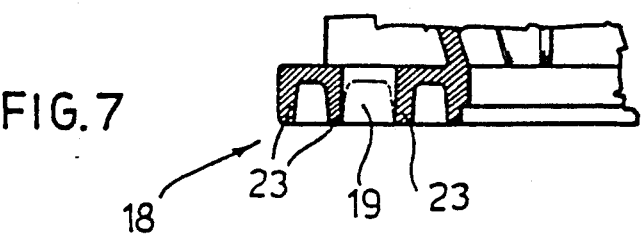
FIG. 7 shows a detail of the sparger.

A detail of the protruding edge 18 is shown in FIG. 7; the reinforcements 23 and the openings 19 for the passage of tie rods 21 are clearly visible.

FIG. 8 shows a transverse section of a tank used for the aerobic treatment of waste waters; in said tank the diffusers 10 are placed and kept in their position on supports 22 in the shape of concrete blocks. The diffusers are placed on top of conduits 35 for the blown-in air, that run horizontally near the bottom of the tank, these conduits 35 also being anchored to support 22 and provided in the lower part with openings for the air distribution.

FIG. 1 shows a perforated fastening system in detail, however it is obvious that other systems can be used. Tie rods 21 have at the lower end a perforated plate 32 inserted on the threaded rods 30 protruding from support 22, the perforated plate being held in place by a nut 31 and washers. The tie rods are fixed at the top to the protruding edge 18 of the sparger 13a by means of nuts screwed on their threaded ends extending from apertures 19.

The function of the diffuser is as follows: the air bubbles delivered from conduit 35 are caught and divided by means of the lower sparger 13, thus they enter the cylindrical body 11 where they follow a spiral path mixing and interact with the liquid to be treated, finally they reach distributor 14 and exit finely divided.

I claim:

1. A diffuser (10) comprising a cylindrical body (11) having a base and a top, at least a helical section (12, 12a) inside the cylindrical body, a dispersing means (13) at the base of the cylindrical body and a distributor (14) at the top of the cylindrical body, said dispersing means (13) comprising a frusto-conical skirt (15) having a major base and a minor base, and internal tongues (16) that extend radially from said frusto-conical skirt.

2. A diffuser as in claim 1, further comprising a second dispersing means (13a) at the top of the cylindrical body, around the distributor (14).

3. A diffuser as in claim 1, fixed to a support (22) by means of tie rods (21), said tie rods (21) having a lower end fast with a perforated plate (32) inserted on threaded rods (30) protruding from the support (22), the plate being fixed by means of a nut (31) and washers.

4. A diffuser as in claim 3, wherein the tie rods (21) have an upper end fixed to the protruding edge (18) of the second dispersing means (13a).

5. A diffuser as claimed in claim 1, wherein the minor base of said dispersing means (13) is provided with a protruding edge (18) having openings (19) for the passage of tie rods (21) therethrough to fix the diffuser (10), and said minor base being provided circumferentially with a seat (28) capable of receiving an end of the cylindrical body (11).

6. A diffuser as in claim 5, wherein openings (20) are provided through the frusto-conical skirt (15) of the dispersing means (13).

7. A diffuser as in claim 5, wherein said protruding edge (18) is provided with reinforcements (23).

8. A diffuser as in claim 1, wherein the distributor (14) comprises a frusto-conical portion (24) with an open major base and a minor base provided with radially distributed openings (26), the frusto-conical portion (24) having a lateral surface with additional openings (27) provided therein.

9. A diffuser as in claim 8, wherein the minor base of the frusto-conical portion (24) of the distributor (14) consists of a conical element (25) having an apex thereof directed toward the inside of the distributor (14).

10. A diffuser as in claim 8, wherein the radially distributed openings (26) have a substantially trapezoidal shape.

11. A diffuser as in claim 8, wherein the additional openings (27), provided in the lateral surface of the frusto-conical portion (24), are rectangular.

12. A diffuser as in claim 8, wherein the open major base of the frusto-conical portion of the distributor is provided circumferentially with an engaging means (29) to be inserted in a seat (28) of the second dispersing means.

* * * * *